United States Patent [19]

Morita et al.

[11] Patent Number: 4,652,724

[45] Date of Patent: Mar. 24, 1987

[54] METHOD OF PRODUCING A CAMSHAFT

[75] Inventors: Akiyoshi Morita; Hideo Nonoyama; Toshiharu Fukuizumi, all of Toyota, Japan

[73] Assignee: Toyota Jidosha Kabushiki Kaisha, Toyota, Japan

[21] Appl. No.: 730,484

[22] Filed: May 6, 1985

[30] Foreign Application Priority Data

May 7, 1984 [JP] Japan ................... 59-91655

[51] Int. Cl.[4] ..................... B23K 26/00; B23K 15/00
[52] U.S. Cl. ..................... 219/121 LM; 219/121 LF; 219/121 EG
[58] Field of Search ............... 214/121 EB, 121 EM, 214/121 EF, 121 EG, 121 PA, 121 PB, 121 L, 121 LM, 121 LE, 121 LF

[56] References Cited

FOREIGN PATENT DOCUMENTS 005819 2/1985 Japan .
234167 11/1985 Japan .
234168 11/1985 Japan .
258426 12/1985 Japan .

Primary Examiner—C. L. Albritton
Attorney, Agent, or Firm—Oblon, Fisher, Spivak, McClelland & Maier

[57] ABSTRACT

A method of producing a cast iron camshaft including the steps of applying a high-density energy source, such as a TIG arc, a laser beam, and an electron beam over the entire sliding surface of a cam to melt the surface portion and cooling the cam by dissipating the localized heat through the camshaft itself so as to form a double structure hardened layer consisting of a chilled layer having a large amount of cementite and a hardened layer of martensite. This method omits the preheating of the camshaft prior to the high-density energy irradiation.

4 Claims, 3 Drawing Figures

METHOD OF PRODUCING A CAMSHAFT

BACKGROUND OF THE INVENTION

1. Field of the Invention

The invention relates to a camshaft and, more particularly, relates to a method of producing a cast iron camshaft having a hardened layer formed by a high-density energy source such as a tungsten inert gas (TIG) arc, a laser beam, and an electron beam.

2. Description of the Prior Art

Three methods have been proposed for hardening a sliding circumferential surface of a cam of a cast iron camshaft.

1 By adopting an induction hardening treatment.

Generally the entire sliding surface of a cam is hardened by the induction hardening method to form a surface hardened layer having a martensite structure. The hardened layer has a good wear resistance to fatigue spalling (flaking), i.e., so-called resistance to pitting, but has a low durability in terms of its resistance to scratch wear, i.e., so-called scuffing resistance. To ensure a high hardness of the hardened layer by a high frequency induction hardening method, a larger amount of hardenability improving elements, such as Cr, Mo, and Ni, should be added to the cast iron material. Such addition increases the percentage of defective castings, and thus the rejection rate, and inevitably the costs, are increased. In this case, the cast iron camshaft as cast has a perlite matrix structure including free cementite and, unavoidably, some free ferrite. When the camshaft having the above structure is hardened by the high frequency induction hardening method, the prescribed hardness of the hardened layer can not always be attained. Also, since the camshaft includes free cementite, it is difficult to properly machine the casting because of its poor cuttability. For example, great care is needed when drilling an oil hole in the cam. Furthermore, in the high frequency induction hardening method, cracks occur frequently during the quenching process.

2. By a casting method using a chill.

In this case, a mould is provided with a chill defining a circumferential surface of a cam on a camshaft. Molten iron is cast in the mould to produce a camshaft having a cam with a chill-hardened surface layer. This method is disadvantageous in that control of the hardening depth is difficult, drilling the oil holes and a main oil bore becomes difficult, and costs are increased due to the necessary production and maintenance of the chill, and to the setting and removal of the chill. Moreover, since the chill-hardened layer has a rough structure and a large amount of free graphite, satisfactory durability in sliding surface properties, such as scuffing resistance and pitting resistance, cannot be obtained. Therefore, design changes become necessary for decreasing the pressure per sliding area to ensure good lubrication and the like.

3. By melting a sliding surface of a cam of an iron camshaft by applying a high-density energy source to and quenching that surface.

As mentioned previously, this high-density energy source should be a TIG arc, a laser beam, or an electron beam. The hardened layer obtained thereby has better sliding properties, compared with layers produced by the first and second hardening methods. This third hardening method has been proposed in, for example, Japanese Examined Patent Publication (Kokoku) No. 57-6494 (publication date: Feb. 5, 1982, priority: DE Patent Application No. 2741567.4), and Japanese Unexamined Patent Publication (Kokai) No. 59-23156 (publication date: Feb. 6, 1984). In this case, the cam should be preheated to 250° C. to 400° C. prior to irradiation by the high-density energy source, and therefore a suitable heating device, e.g., a heating furnace, should be provided.

SUMMARY OF THE INVENTION

An object of the present invention is to improve a hardening method using a high-density energy source for melting a cam sliding surface of a camshaft.

Another object of the present invention is to provide an improved method of producing a camshaft with a surface hardened cam, whereby the cam sliding properties are superior to those produced by the above-mentioned first and second hardening methods and at least equivalent to those of the above-mentioned third hardening method.

The present inventors found that, in the third hardening method using the high-density energy source melting process, even if the preheating step is omitted, the sliding properties of the surface hardened cam are still superior.

These and other objects of the present invention are attained by a method of producing a cast iron camshaft comprising the steps of: applying a high-density energy source, such as a TIG arc, a laser beam, and an electron beam, on the whole circumferential sliding surface of a cam of the camshaft to melt the surface layer of the cam, and cooling the cam by dissipation of the localized heat through the camshaft itself to form a double structure hardened layer consisting of a chilled layer which is melted and cooled and has a large amount of cementite and a hardened layer which is heated above austenizing point and then cooled to form a martensite layer.

BRIEF DESCRIPTION OF THE DRAWINGS

A more complete appreciation of the invention and many of the attendant advantages thereof will be readily obtained as the same becomes better understood by reference to the following detailed description when considering in connection with the accompanying drawings, wherein.

DESCRIPTION OF THE PREFERRED EMBODIMENTS

Figure 1:
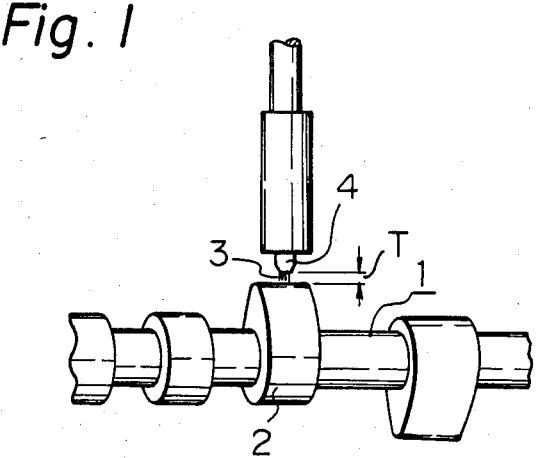
FIG. 1 is a schematic view of a camshaft and an arc-generating torch.
Figure 2:
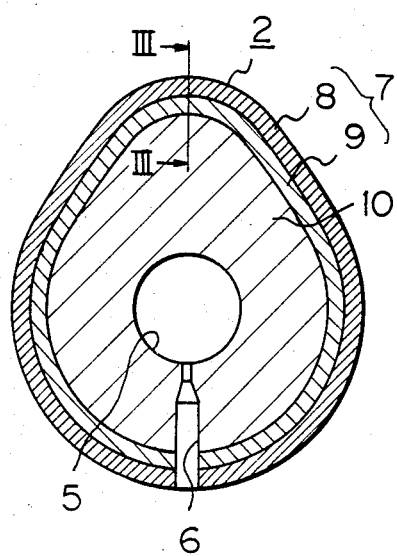
FIG. 2 is a sectional view of a cam of a camshaft produced in accordance with a method of the present invention.
Figure 3:
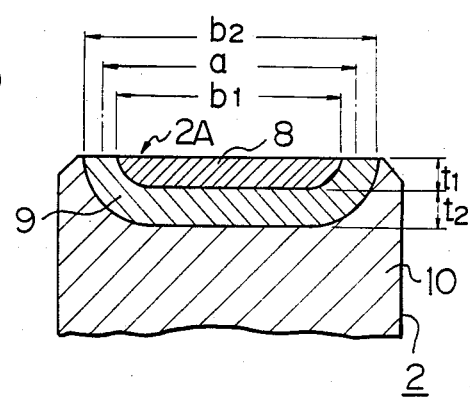
FIG. 3 is a partial sectional view taken along line III—III in FIG. 2.

Referring to FIGS. 1 through 3, a method of producing a camshaft in accordance with the present invention will now be explained.

A camshaft 1 with cams 2 (FIG. 1) is made of cast iron, preferably gray cast iron, having a composition of, for example, 3.4% C, 2.0% Si, 0.65% Mn, 0.20% P, 0.20% S, 0.45% Cr, 0.15% Ni, 0.20% Mo, and 0.010% Ce (by weight %), with the balance being Fe. The camshaft 1 is produced by a conventional casting method without the use of chills, and has the following dimensions: camshaft length, 360 mm; cam width, 15 mm; cam base circular diameter, 30 mm. The cast camshaft 1 is machined to the specified dimensions as follows. First, surplus portions of the camshaft are removed by cutting, the camshaft is drilled to form a main oil bore (i.e., a through hole) 5 (FIG. 2) in a longitudinal direction, each of the cams 2 is drilled to form an oil hole 6 opening at the base circular portion thereof and communicating with the main oil bore 5, and finally, black skin on the circumferential sliding surface of each cam 2 is removed by cutting.

In order to form a surface hardened layer in the cam, the cam 2 of the camshaft 1 is locally and continuously heated by a TIG arc 3 generated between the cam 2 and a tungsten arc-generating torch 4, to locally melt the circumferential surface (i.e., the sliding surface) of the cam 2, and the molten portion and heated portion are cooled by dissipation of the localized heat through the camshaft itself. According to the present invention, the camshaft 1 is not preheated as in the conventional method. When the arc 3 is generated, the camshaft 1 is rotated on its longitudinal axis, the tungsten arc torch 4 is positioned reciprocal to the longitudinal direction of the axis of the camshaft 1 at a distance less than the width of the cam 2, and simultaneously, the gap between the cam 2 and the tungsten arc torch 4 is maintained at a constant distance. Accordingly, the arc 3 oscillates over the entire circumferential cam surface. It is possible to use a laser beam or an electron beam as the high-density energy source instead of the TIG arc.

This process of melting by high-density energy irradiation and cooling due to dissipation of the localized heat through the camshaft itself, produces a double structure hardened layer 7 consisting of a chilled layer 8 and a hardened layer 9 as the surface hardened layer, as shown in FIGS. 2 and 3. Reference numeral 10 indicates an as-cast portion that is not hardened. The chilled layer 8 is that portion which has been melted by the TIG arc 3 and then cooled, and has a large amount of cementite. Preferably, the chilled layer 8 has a thickness $t_1$ (FIG. 3) (i.e., a chilled depth) of from 0.3 to 1.5 mm. When the thickness of the chilled layer 8 is less than 0.3 mm, the desired improvement of the sliding properties by forming the chilled layer 8 is not satisfactory. When the thickness of the chilled layer 8 is more than 1.5 mm, the chill hardening caused by the cooling through the camshaft 1 itself after the melting is insufficient, and thus the hardness of the chilled layer is not satisfactory. The hardened layer 9 under the chilled layer 8 is that portion which is heated above austenizing point and then cooled to form a martensite layer. Preferably, the hardened layer 9 has a thickness $t_2$ (FIG. 3) of from 0.3 to 2.0 mm. When the thickness of the hardened layer 9 is less than 0.3 mm, a sufficient martensite layer is not formed, i.e., the martensite layer includes partly unmartensite portions, so that abnormal wear may occur at the interface between the hardened layer 9 and the unhardened portion 10 on the sliding surface 2A. When the thickness of the hardened layer 9 is more than 2.0 mm, the wear-resistant properties of the chilled layer 8 are not sufficiently displayed and cementite in the chilled layer 8 is coarsened.

EXAMPLES

Nine camshafts having the above-mentioned composition and dimensions were produced by casting and machining. A TIG arc was applied to the whole circumferential sliding furface of the cams of the camshafts under the following conditions.

Preheating of camshaft: None
DC current: 80–130A
DC voltage: 20 V
Camshaft rotation speed: 0.7–1.0 rpm
Torch reciprocation: 50–60 oscillations per minute
Distance (gap) T between can and torch: 2 mm The oscillating width of the TIG arc torch 4 was varied, and thus the width $b_1$ of the chilled layer 8 and the width $b_2$ of the hardened layer 9 were also varied. The data showing the thickness and widths of the obtained chilled layer 8 and hardened layer 9 are given in Table 1. In Table 1 the widths are indicated by a ratio $B_1$ of the chilled layer width $b_1$ to a contacting width a of a rocker-arm (not shown) and a ratio $B_2$ of the hardened layer width $b_2$ to the contacting width a.

As a first comparative example, a camshaft having the same dimensions as the above-mentioned camshafts 2 as produced by a casting process in which chills were set in a mould for the cams.

As second comparative examples, six camshafts having the above-mentioned composition and dimensions were produced by casting and machining. A TIG arc was applied to the cams of the camshafts under the above-mentioned condions except for a preheating of the camshaft to 350° C.

Each of the total of sixteen camshafts produced was assembled in an engine and was tested for 400 hours as a durability test under medium load conditions, wherein the engine idling and engine operations at 2500 rpm are repeatedly alternated. The wear amount results, i.e., wear damage depths, obtained by the above-mentioned durability test are also shown in Table 1. The degree of scuffing defects generated on the cam sliding surface is indicated in steps of an index of from 0 to 10 in the "estimated scuffing" column of Table 1. The index of 10 indicates the most resistance to scuffing. Taking into consideration the amount of wear and estimated scuffing on the cam sliding surface after the durability test, the sliding properties of each of the camshafts are integrally estimated as shown in the "integral estimation" column of Table 1. Symbols o , o, Δ, x, and xx in the integral estimation column indicate best, better, good, bad, and very bad, respectively. The present inventors also examined the cam to determine whether or not abnormal wear occurred at the interface between the surface hardened layer and the unhardened portion on the cam sliding surface.

TABLE 1

| | | Chilled layer | | Hardened layer | | Cam profile | | | Base circular portion of cam | | | |
|---|---|---|---|---|---|---|---|---|---|---|---|---|
| | Sample No. | Thickness $t_1$ mm | Ratio ($b_1$/a) | Thickness $t_2$ mm | Ratio ($b_2$/a) | Wear amount μm | Estimated scuffing | Integral estimation | Wear amount μm | Estimated scuffing | Integral estimation | Abnormal wear |
| Present invention | | | | | | | | | | | | |
| Thin | 1 | 0.3 | 0.7 | 0.2 | 0.3 | 120 | 6 | Δ | 40 | 10 | | Occurred |
| chilled | 2 | 0.4 | 0.9 | 0.2 | 1.0 | 60 | 9 | o | 30 | 10 | | None |
| layer | 3 | 0.3 | 0.9 | 0.2 | 1.1 | 75 | 8 | o | 50 | 10 | | None |
| Medium | 4 | 0.8 | 0.6 | 0.7 | 0.8 | 100 | 6 | x | 18 | 10 | | Occurred |
| chilled | 5 | 0.8 | 0.8 | 0.8 | 1.1 | 40 | 10 | | 15 | 10 | | None |
| layer | 6 | 0.9 | 0.9 | 0.9 | 1.1 | 36 | 10 | | 20 | 10 | | None |

TABLE 1-continued

| | Sample No. | Chilled layer | | Hardened layer | | Cam profile | | | Base circular portion of cam | | | Abnormal wear |
|---|---|---|---|---|---|---|---|---|---|---|---|---|
| | | Thickness $t_1$ mm | Ratio ($b_1$/a) | Thickness $t_2$ mm | Ratio ($b_2$/a) | Wear amount $\mu m$ | Estimated scuffing | Integral estimation | Wear amount $\mu m$ | Estimated scuffing | Integral estimation | |
| Thick chilled layer | 7 | 1.5 | 0.6 | 2.0 | 0.8 | 105 | 6 | x | 23 | 10 | | Occurred |
| | 8 | 1.3 | 0.7 | 1.7 | 1.0 | 42 | 10 | | 18 | 10 | | None |
| | 9 | 1.4 | 0.8 | 1.8 | 1.1 | 53 | 9 | | 21 | 10 | | None |
| (Comparative examples) | | | | | | | | | | | | |
| Using chills | 10 | 15 | 1.2 | — | — | 300 | 4 | xx | 400 | 3 | xx | None |
| Preheating at 350° C. | | | | | | | | | | | | |
| Thin chilled layer | 11 | 0.3 | 0.8 | (Mixture of sorbite and troostite) | | 180 | 5 | o | 55 | 9 | o | Occurred |
| | 12 | 0.3 | 1.0 | | | 100 | 7 | o | 65 | 9 | o | None |
| | 13 | 0.4 | 1.1 | | | 90 | 7 | o | 65 | 9 | o | None |
| Thick chilled Layer | 14 | 1.3 | 0.7 | (Mixture of sorbite and troostite) | | 160 | 5 | Δ | 70 | 8 | o | Occurred |
| | 15 | 1.5 | 0.9 | | | 120 | 7 | Δ | 80 | 8 | o | Occurred |
| | 16 | 1.3 | 1.1 | | | 100 | 7 | o | 65 | 9 | o | None |

As is evident from Table 1, cams produced in accordance with the present invention and having a chilled layer thickness $t_1$ of 0.3 mm or more and a hardened layer width $b_2$ larger than a contacting width a of a rocker arm have superior wear-resistance and scuffing-resistance. In samples 1, 4, and 5, the wear amount (wear damage depth) at the cam profile is larger than that of the other samples, because the hardened layer width $b_1$ is smaller than the contacting width a of the rocker arm.

Furthermore, a camshaft corresponding to sample 5 of Table 1 was tested for 500 hours in a medium speed pitting test under conditions wherein an engine was operated at 2000 rpm and a spring load was increased to 1.5 times the normal load. As a result, slight narrow and extremely shallow pitting having a depth of less than 10 $\mu m$ and different from normal pitting was formed on the cam sliding surface. The tested camshaft was tested for a further 300 hours under the same conditions. In this case, the pitting did not progress further. Obviously, numerous modifications and variations of the present invention are possible in light of the above teachings. It is therefore to be understood that within the scope of the appended claims, the invention may be practiced otherwise than as specifically described herein.

We claim:

1. A method of producing a camshaft of cast iron comprising applying a high-density energy source, such as a TIG arc, a laser beam, and an electron beam on the whole circumferential sliding surface of a cam of the camshaft to melt the surface portion, and cooling the cam by dissipating localized heat through the camshaft itself to form a double structure hardened layer consisting of a chilled layer which is melted and cooled and has a large amount of cementite and a hardened layer which is heated above an austenizing point and then cooled to form a martensite layer.

2. A method according to claim 1, wherein said chilled layer has a thickness of from 0.3 to 1.5 mm and said hardened layer has a thickness of from 0.3 to 2.0 mm.

3. A method according to claim 1 further comprising, before said applying step, drilling said camshaft to form a longitudinal oil bore along the axis of said camshaft and a radial oil hole at the base circular portion of said cam.

4. A method according to claim 1, wherein the width of said hardened layer at the surface is made larger than a contacting width of a cam follower, such as a rocker-arm.

* * * * *